United States Patent
Ellis et al.

(10) Patent No.: US 7,913,501 B2
(45) Date of Patent: Mar. 29, 2011

(54) WATER-COOLED AIR CONDITIONING SYSTEM USING CONDENSER WATER REGENERATION FOR PRECISE AIR REHEAT IN DEHUMIDIFYING MODE

(75) Inventors: Daniel L. Ellis, Edmond, OK (US); Laxmikant N. Nerurkar, Edmond, OK (US)

(73) Assignee: Climate Master, Inc., Oklahoma City, OK (US)

(*) Notice: Subject to any disclaimer, the term of this patent is extended or adjusted under 35 U.S.C. 154(b) by 93 days.

(21) Appl. No.: 12/211,231

(22) Filed: Sep. 16, 2008

(65) Prior Publication Data
US 2009/0229286 A1    Sep. 17, 2009

Related U.S. Application Data

(63) Continuation of application No. 11/161,808, filed on Aug. 17, 2005, now abandoned.

(60) Provisional application No. 60/522,124, filed on Aug. 18, 2004.

(51) Int. Cl.
*F25B 29/00* (2006.01)
*F25D 17/06* (2006.01)
*F25D 17/02* (2006.01)

(52) U.S. Cl. ............................ 62/173; 62/90; 62/434
(58) Field of Classification Search ............... 62/173, 62/90, 176.4, 176.5, 176.6, 181, 183, 434, 62/428; 165/228
See application file for complete search history.

(56) References Cited

U.S. PATENT DOCUMENTS
5,613,372 A * 3/1997 Beal et al. ............... 62/434
6,260,366 B1 * 7/2001 Pan ....................... 62/173

* cited by examiner

*Primary Examiner* — Chen-Wen Jiang
(74) *Attorney, Agent, or Firm* — Mary M. Lee

(57) ABSTRACT

A water-cooled air conditioning system using a regenerative condenser water circuit to reheat the supply air during a dehumidification mode. The air conditioning system may be any type of water-cooled system, including a water source heat pump or water-cooled air conditioner. The reheat circuit circulates water leaving the condenser through the reheat heat exchanger and then returns the water to the condenser inlet. Thus, the reheat circuit ensures that water leaving the condenser is warm enough to provide sufficient reheating for the supply air, regardless of the water source temperature. In addition, a modulation assembly controls the amount of water flowing through the reheat circuit, and thereby its temperature, so that the temperature of the reheated supply air can be maintained within a narrow range.

16 Claims, 3 Drawing Sheets

WATER-COOLED AIR CONDITIONING SYSTEM USING CONDENSER WATER REGENERATION FOR PRECISE AIR REHEAT IN DEHUMIDIFYING MODE

This application claims the benefit of the filing date of provisional application Ser. No. 60/522,124, entitled "Condenser Water Regenerative Reheat for Water-Cooled Air Conditioners and Water-Source Heat Pumps," filed Aug. 18, 2004, the contents of which are incorporated herein by reference. This application is a continuation application of application Ser. No. 11/161,808 entitled "Water-Cooled Air Conditioning System Using Condenser Water Regeneration for Precise Reheat in Dehumidifying Mode," filed Aug. 17, 2005, the contents of which are incorporated herein by reference.

FIELD OF THE INVENTION

The present invention relates generally to air conditioning systems and, more particularly but without limitation, to water-cooled air conditioning and water source heat pump systems equipped with supply air reheat to provide dehumidification without sensible cooling.

BACKGROUND OF THE INVENTION

Modern heating and cooling systems are increasingly required to control indoor humidity levels in addition to the sensible air temperature. One reason for this is the desire to provide ever higher levels of occupant comfort. Improving indoor air quality through dehumidification is important for health reasons as well, because high humidity is associated with mold and mildew and other unpleasant and hazardous conditions.

In the cooling mode, air conditioners typically provide dehumidification only as a byproduct of the cooling process, with 20-30% of the total cooling capacity usually being apportioned to latent cooling (dehumidification) and the balance to sensible cooling (the measurable reduction in air temperature across the cooling coil). In most applications, this proportionate level of dehumidification is adequate during those periods when the cooling system is operating on a nearly continuous basis. However, during periods of low space cooling demand, the cooling system will not operate long enough to remove the amount of moisture required to control indoor humidity. There are also applications where dehumidification is required during periods when sensible cooling is not needed at all. Thus, there are situations where an air conditioning system must provide dehumidification independent of sensible cooling.

One means of providing a dehumidification mode in a cooling system is referred to as a "reheat" process. In a reheat process, the supply air is reheated to a comfortable level after being cooled for adequate dehumidification. There are several known techniques to perform the reheating process, such as electric resistance heaters, desuperheating or condensing heat exchangers connected to the cooling refrigerant system, and heat exchangers connected to a boiler. The heat source in the preferred methods is some form of waste heat generated in the system as a result of the cooling process. This greatly improves the energy efficiency of the dehumidification process, as no new energy is consumed for reheat.

DETAILED DESCRIPTION OF THE PREFERRED EMBODIMENTS

Figure 1:
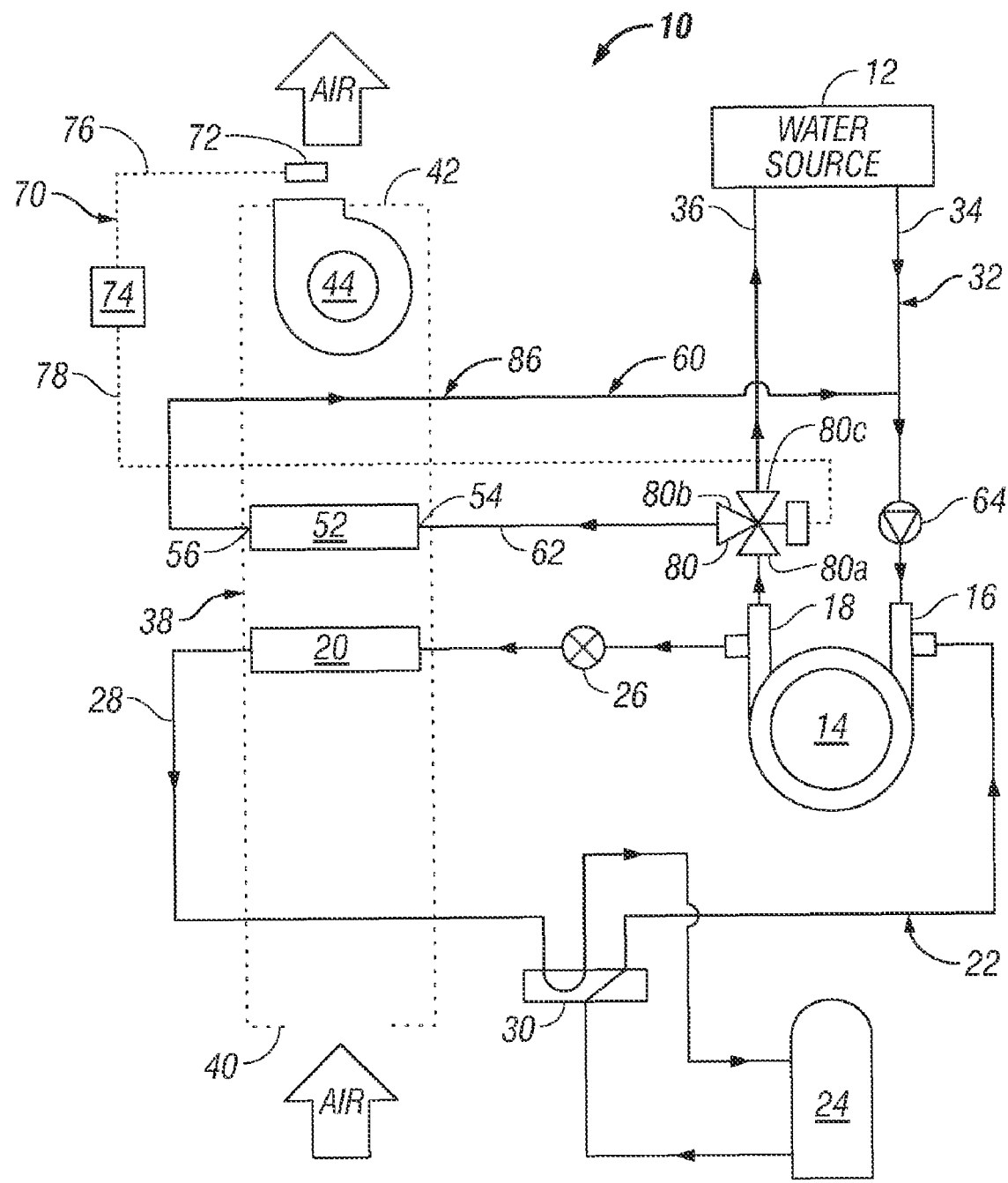
FIG. 1 is a schematic of a first embodiment of the present invention comprising a water-cooled air conditioning system with a regenerative condenser water reheat circuit in which the flow through the reheat circuit is controlled by means of a diverting valve located in the return conduit of the condenser where the reheat circuit connects.

Referring now to the drawings in general and to FIG. 1 in particular, there is shown therein and designated generally by the reference number 10 an air conditioning system constructed in accordance with the present invention. The air conditioning system 10 shown and described herein is a water source heat pump system illustrated in the cooling mode. However, the present invention is not so limited and can be implemented equally well in systems that provide cooling only. Accordingly, as used herein, "air conditioning system" refers to a system that conditions or adjusts the temperature and humidity of the air in a structure or space, and includes but is not limited to cooling-only systems as well as systems that heat and cool the air.

The air conditioning system 10 of the present invention comprises a water-cooled air conditioning system designed to condition the air in an enclosed space (not shown in the drawings), such as a building or other structure. As used herein, "water-cooled air conditioning system" denotes a system that uses a water source 12 as a heat sink or heat source, and includes water-cooled air conditioners and water-source heat pumps, such as the system illustrated in the drawings.

Typically, the water source 12 will be one of three basic types: (1) liquid circulating in a temperature-controlled piping loop with temperature control being mechanical, such as cooling towers and boilers or similar devices; (2) ground water pumped from a well, lake, river or stream; or, (3) liquid circulating through a sub-surface heat exchange piping loop, which may be placed in horizontal trenches or vertical bores, or submerged within a body of surface water.

With continued reference to FIG. 1, the system 10 includes a condenser 14 that comprises a refrigerant to water heat exchanger, that is, it is adapted to conduct heat from a refrigerant to water. The condenser 14 has a water inlet 16 and a water outlet 18. Also included is an evaporator 20 comprising a refrigerant to air heat exchanger, that is, it is adapted to transfer heat from air to a refrigerant. The evaporator 20 and condenser 14 are connected within a refrigerant circuit 22 with a compressor 24 and an expansion device 26. The refrigerant circuit 22 also comprises conduits 28 adapted to circulate refrigerant between the various components of the refrigerant circuit. As used herein, "refrigerant" denotes a suitable phase-changing heat exchange fluid for use in a vapor-compression air conditioning or heat pump system. The refrigerant circuit 22 may include a reversing valve 30 where the system comprises a heat pump.

The system 10 also comprises a condenser water circuit 32. The condenser water circuit 32 includes a supply conduit 34 adapted to circulate water from the water source 12 to the water inlet 16 of the condenser 14 and a return conduit 36 adapted to circulate water from the water outlet 18 of the condenser back to the water source.

Still further, the system 10 includes an air circuit 38 for circulating air in the space (not shown) through the system 10. More specifically, the air circuit 38 is adapted to receive return air from the space at an air inlet 40, to circulate the air through the evaporator 20, and to direct the conditioned supply air leaving the system 10 through an air outlet 42 back into the space. The air circuit 38 usually will include one or more blowers 44 for moving the air.

Referring still to FIG. 1, the system 10 comprises a reheat heat exchanger 52 in the form of a water to air heat exchanger for transferring heat from water to the supply air. The heat exchanger 52 is positioned in the air circuit 38 downstream of the evaporator 20. The heat exchanger 52 has a water inlet 54 and a water outlet 56.

To provide a heat source to the reheat heat exchanger 52, the system 10 is equipped with a regenerative condenser water reheat circuit 60 comprising conduits 62 and a water pump 64. The reheat circuit 60 is adapted to circulate water from the return conduit 36 of the condenser water circuit 32 to the water inlet 54 of the reheat heat exchanger 52, and from the water outlet 56 of the reheat heat exchanger to the supply conduit 34 of the condenser water circuit.

In the embodiment of FIG. 1, the pump 64 is located in the supply conduit 34 of the condenser water circuit 32 between the water inlet 16 of the condenser 14 and the junction of the reheat circuit 60 with the supply conduit. Alternately, the pump 64 may be positioned in the return conduit 36 between the water outlet 18 of the condenser 14 and the flow control device, which is described below. In either of these positions, the pump 64 is in a portion of the condenser water circuit 32 which is between the condenser 14 and the junction of the reheat circuit 60 with the condenser water circuit 32. In either of these locations the pump 64 can support condenser water circulation in other modes, such as cooling or heating (if a heat pump). Where the pump 64 serves the single purpose of circulating water through the reheat circuit 60, it can be located anywhere within the reheat circuit.

As explained previously, the reheat function preferably is activated only in the dehumidification mode when the space requires little or no sensible cooling, but the humidity is still higher than desired. During dehumidification mode, the reheat circuit brings the cooled, dehumidified air leaving the evaporator back up to within a comfortable target temperature range. Thus, as shown in FIG. 1, to control the operation of the reheat circuit 60, the system 10 also includes a reheat control assembly 70. Preferably, the control assembly 70 includes a temperature sensor 72 for detecting the temperature of the supply air leaving the air circuit 38 and entering the space through the air outlet 42. The control assembly 70 also includes a controller 74 to receive the temperature data from the sensor 72 along the data line 76 and, in response to such data, to communicate by means of a data line 78 with a flow control device.

The flow control device of the control assembly 70 can be a switch that simply activates the reheat circuit 60 in response to a target temperature. However, in most instances, a simple on/off control permits undesirably wide fluctuations in the supply air temperature. Thus, in the preferred practice of this invention, the flow control device has the capacity to vary the amount of flow that is directed through the reheat circuit 60. In this first preferred embodiment of FIG. 1, the flow control device is a diverter valve 80. In the system illustrated, the diverter valve 80 is located at the junction of the reheat circuit 60 and the return conduit 36 from the condenser 14.

In this embodiment, where the flow control is a diverter valve 80, the amount of condenser water circulated through the reheat heat exchanger 52 can be varied or modulated. This enables the system to maintain a relatively constant selected or target temperature in the supply air. Thus, the control assembly 70 of this embodiment serves also a flow modulation assembly. For example, if the target temperature selected is 72 degrees Fahrenheit, the control assembly 70 will cause more or less condenser water to flow through the reheat exchanger 52 to maintain the temperature of the supply air at about 72 degrees Fahrenheit.

Having described a first preferred embodiment of the air conditioning system 10 of the present invention, its operation now will be explained. In the cooling mode, the evaporator 20 removes heat from the return air and the refrigerant circuit returns the heated refrigerant to the condenser 14 into which the heat is rejected. In the condenser 14, the heat is transferred to the condenser water circulating through the condenser by means of the condenser water circuit. 32. In addition to the heat absorbed from the air being cooled, the heat rejected into the condenser also includes the heat generated by the electrical input of the compressor 24.

During the cooling mode, the control assembly 70 deactivates the reheat circuit 60. That is, the diverting valve 80 is positioned to direct all flow from its inlet 80a to the outlet path 80c feeding the condenser water return conduit 36, thus causing the water flow in the condenser water circuit 32 to completely bypass reheat circuit 60. The condenser water flows from the water source 12 to the condenser 14 and then directly back to the water source.

During times when the sensible space temperature is at or below the desired level so that sensible cooling is not required, but the space humidity level is higher than desired, the system 10 may be operated in a non-cooling dehumidification mode. During this mode, the refrigerant circuit 22 continues to operate in cooling mode.

As the temperature of the supply air drops below a selected target temperature, the controller 74 activates the reheat circuit 60. More specifically, depending on the temperature reading of the sensor 72, the diverting valve 80 is modulated by the controller 74 to divide the outlet flow; a selected portion of the condenser water supply is caused to flow through the reheat circuit 60 and the remainder of the condenser water continues back to the water source 12. The controller 74 continues to adjust the diverting valve 80, as necessary, to maintain the supply air temperature at the desired set point or target temperature, such as 72 degrees Fahrenheit.

Now it will be seen that the reheat circuit 60 forms a condenser water regeneration loop or circuit: water from the outlet 18 of the condenser 14 is circulated by the diverter valve 80 through the reheat heat exchanger 52 and then returned to the supply conduit 34 where it reenters the inlet 16 of the condenser through the pump 64.

The condenser water contains all of the heat removed from the air by the evaporator 20, both sensible and latent, and also the heat generated by the electricity operating the compressor 24. Consequently, there is more heat in the condenser water than is required to provide complete sensible reheating of the air. The diverter valve 80 operates to divide its incoming flow at 80a between the outlet 80b supplying reheat heat exchanger 52 and the outlet 80c returning the water to the water source 12. The valve 80, in response to the controller 74, allocates to the reheat heat exchanger 52 only that portion of the condenser heat required for reheating and rejects the balance back to the water source 12.

The temperature of the water in the water source 12 can vary widely, typically ranging from 40 to 100 degrees Fahrenheit. When the temperature of incoming water from the water source 12 is near or below the target supply air temperature, the temperature of the water leaving the condenser 14 will be insufficient to provide adequate reheating of the supply air. With the condenser water regeneration feature of the present invention, the diverter valve 80 reduces the relative amount of input from the cold incoming water source in favor of input from the reheat circuit 60. In this way, the reheat circuit water temperature can reach an equilibrium that is higher than that of the incoming water source temperature, as needed, to achieve the target supply air temperature. Thus, even when the water from the water source 12 is cold, condenser water regeneration ensures that the reheat heat exchanger 52 can reheat the cooled air sufficiently to maintain the target supply air temperature setting.

It will be apparent that the complete system 10 can be implemented in its entirety at new installations. However, the present invention also can be employed by modifying existing water-cooled systems by retro-fitting them with a combination of the reheat circuit 60, the control assembly 70, and the reheat heat exchanger 52, together forming a reheat assembly designated generally herein by the reference numeral 86.

Figure 2:
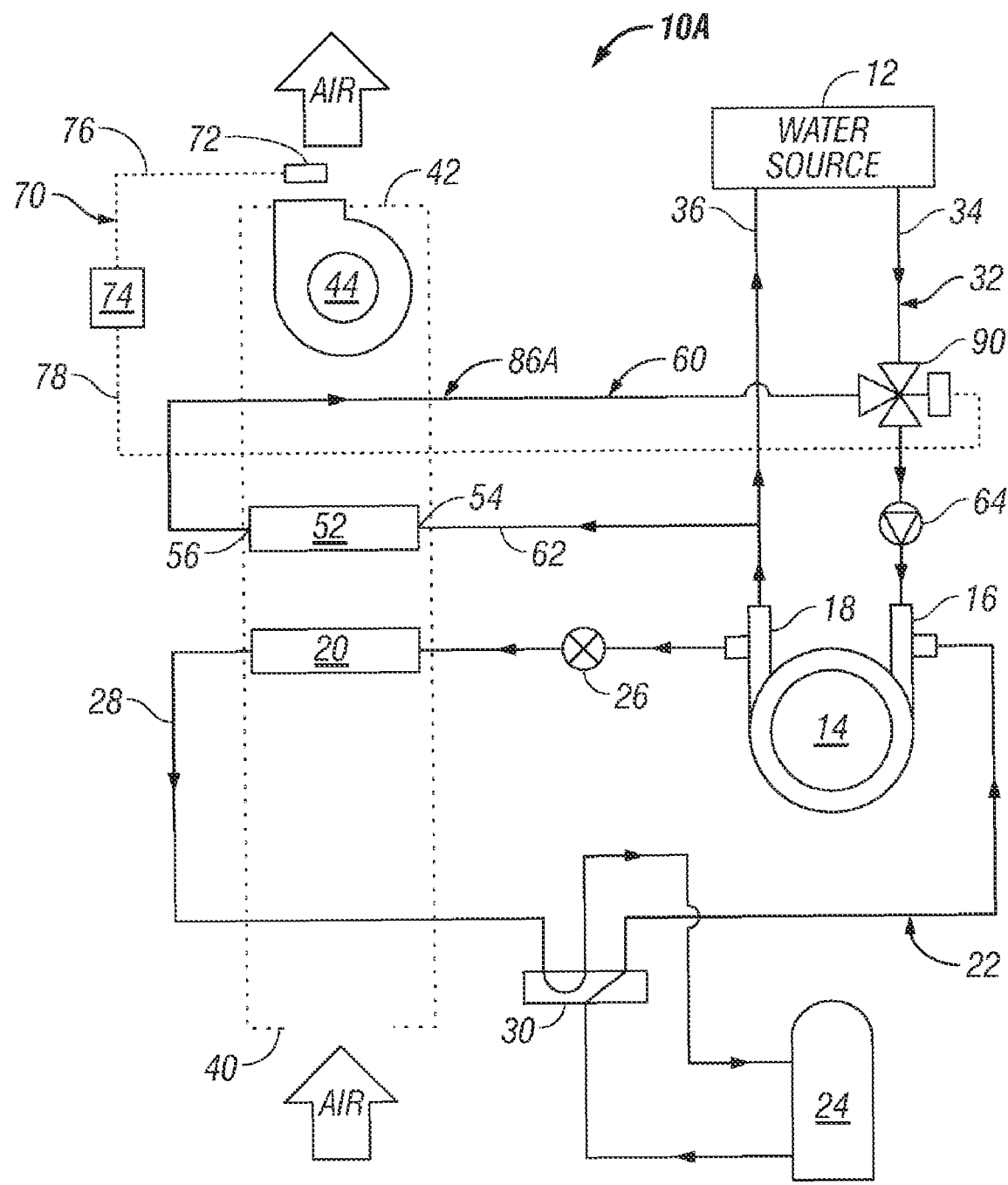
FIG. 2 is a schematic of a second embodiment of the present invention comprising a water-cooled air conditioning system with a regenerative condenser water reheat circuit in which the flow through the reheat circuit is controlled by means of a mixing valve located in the supply conduit of the condenser where the reheat circuit connects.

Turning now to FIG. 2, there is shown therein a second embodiment of the present invention designated generally by the reference numeral 10A. The system 10A of FIG. 2 is similar to the system 10 of FIG. 1, and like reference numerals indicate like elements. More specifically, the system 10A comprises a condenser 14, an evaporator 20, a refrigeration circuit 22, and water condenser circuit 32. A similar air circuit 38 also is included.

The reheat assembly 86A differs from the reheat assembly 86 of FIG. 1 in that instead of the diverting valve 80 in the first embodiment, the control assembly 70 comprises a mixing valve 90. The mixing valve 90 is positioned in the supply conduit 34 of the condenser water circuit 32 at the junction of the reheat circuit 60 with the supply conduit. The control assembly 70 is similarly provided with a supply air temperature sensor 72 by which the controller 74 regulates the reheat circuit operation through the mixing valve 90. The mixing valve 90 serves the same function of proportioning or modulating the condenser water flow between the reheat circuit 50A and the water source 12. As in the reheat assembly 86 of FIG. 1, the pump 64 of the reheat assembly 86A of FIG. 2 can be repositioned to support condenser water flow in other modes, or to provide flow only for the reheat circuit 60, as may be desired.

Figure 3:
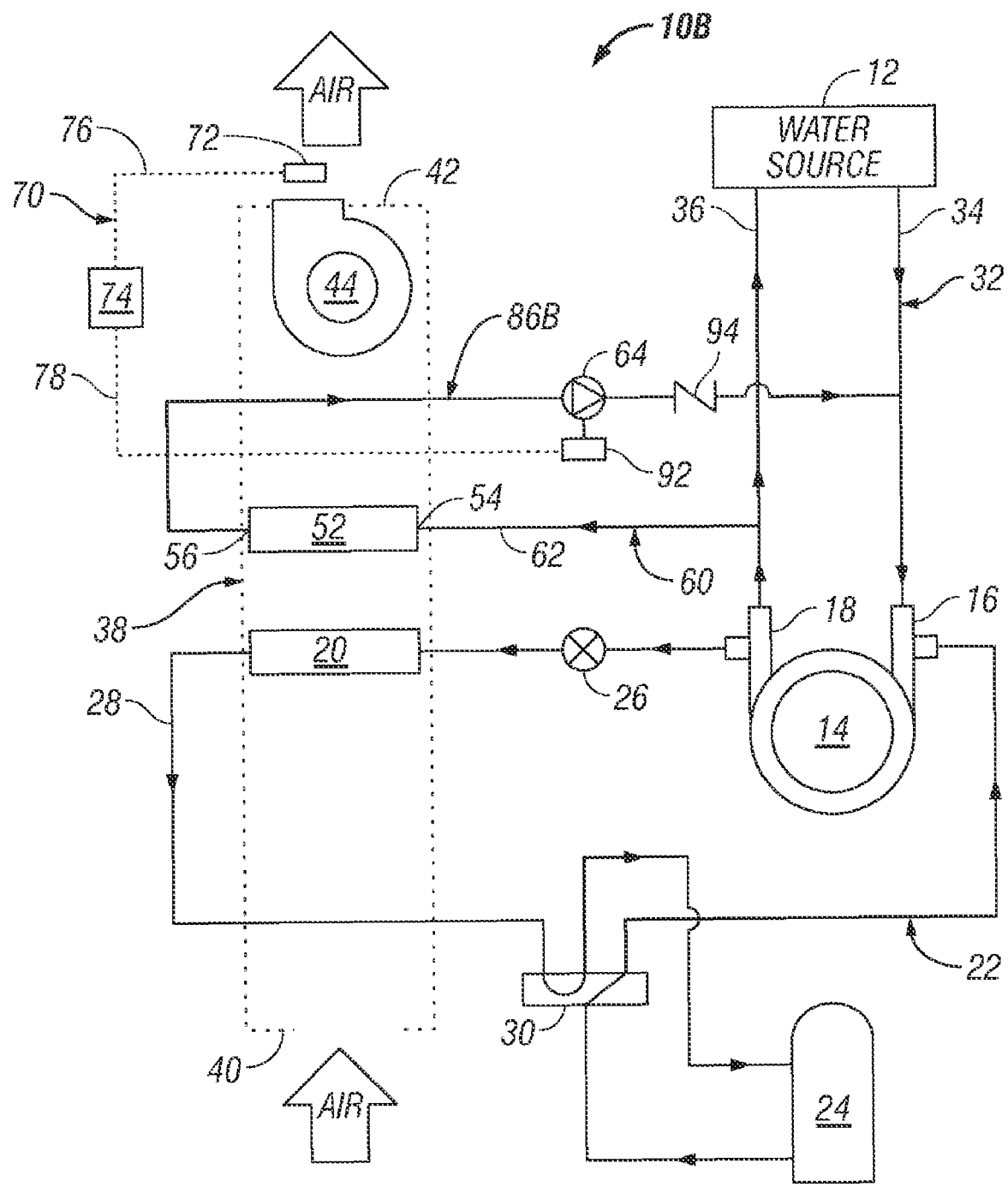
FIG. 3 is a schematic of a third embodiment of the present invention comprising a water-cooled air conditioning system with a regenerative condenser water reheat circuit in which the flow through the reheat circuit is controlled by means of a variable speed water pump.

A third embodiment of the present invention is illustrated in FIG. 3, to which attention now is directed. The system 10B of FIG. 3 is similar to the systems 10 of FIG. 1 and 10A of FIG. 2, and like reference numerals indicate like elements. More specifically, the system 10B comprises a condenser 14, an evaporator 20, a refrigeration circuit 22, and water condenser circuit 32. A similar air circuit 38 also is included.

The reheat assembly 86B differs from the reheat assembly 86 of FIG. 1 and the reheat assembly 86A of FIG. 2 in that instead of the diverting valve 80 or the mixing valve 90, the control assembly 70 comprises a variable speed water pump control 92 connected to the pump 64. The pump 64 and pump control 92 are positioned in the reheat circuit 60 between the outlet 56 of the reheat heat exchanger 52 and the junction of the reheat circuit with the supply conduit 34 to the condenser 14. A check valve 94 is included in the reheat circuit 60 to prevent the water source supply water from flowing in a reverse direction through the reheat circuit 60 when the pump 64 is inactive.

The control assembly 70 is similarly provided with supply air temperature data by the sensor 72, and the controller 74 regulates the reheat circuit operation by regulating the pump flow through the pump control 92. Thus, the pump flow control 92 modulates the speed of the pump 64, thereby serving the same function of proportioning or modulating the condenser water flow between the reheat circuit 60 and the water source 12. The pump 64 and the check valve 94 may be positioned elsewhere within the reheat circuit 60 between the reheat heat exchanger inlet 54 and the condenser water return conduit 36. In the embodiment of FIG. 3, the water pump 64 provides flow only for the reheat circuit 60.

In accordance with the method of the present invention, a condenser water regeneration circuit is employed to reheat supply air in a water-cooled air conditioning system. In response to the temperature of the supply air leaving the air circuit, condenser water from the return conduit of the condenser water circuit is circulated in heat exchange relation with air in the air circuit downstream of the evaporator. Thereby, the temperature of the supply air is adjusted towards a selected target temperature and then directed into the space. The condenser water then is returned to the supply conduit of the condenser water circuit. Preferably, the method includes modulating the amount of the condenser water return flow that is circulated in heat exchange relation with the air to maintain the supply air near a selected target temperature or set point.

Now it will be appreciated that the condenser water regeneration reheat circuit of the present invention provides several advantages. The reheat assembly provides an air conditioning system in which complete and precise air reheating is possible, regardless of the condenser water supply temperature. The modulating nature of the reheat assembly also compensates for variations in return air temperature. Thus, the supply air temperature delivered to the space can be maintained at any reasonable target temperature or set point during the dehumidification mode, greatly improving comfort in the space. Moreover, while this reheat system is ideal for dehumidification applications, it is suitable for use in other applications where precise temperature control of the supply air is desired.

Changes can be made in the combination and arrangement of the various parts and steps described herein without departing from the spirit and scope of the invention as defined by the following claims.

What is claimed is:

1. A water-cooled air conditioning system for conditioning air in an enclosed space, the system associated with a water source, the system comprising:
   a condenser adapted to conduct heat from a refrigerant to water, the condenser having a water inlet and a water outlet;
   an evaporator adapted to conduct heat from air to refrigerant;
   a refrigerant circuit including a compressor and an expansion device and adapted to circulate refrigerant between the condenser and evaporator;
   a condenser water circuit comprising a supply conduit adapted to circulate water from the water source to the water inlet of the condenser and a return conduit adapted to circulate water from water outlet of the condenser to the water source;

an air circuit adapted to receive return air from the space, to circulate the air through the evaporator, and to direct conditioned supply air to the space;

a reheat heat exchanger adapted to conduct heat from water to air, the reheat heat exchanger disposed in the air circuit downstream of the evaporator and having a water inlet and a water outlet;

a regenerative condenser water reheat circuit including a pump and adapted to circulate water from the return conduit of the condenser water circuit to the water inlet of the reheat heat exchanger and from the water outlet of the reheat heat exchanger to the supply conduit of the condenser water circuit; and a control assembly comprising:
 a temperature sensor for detecting the temperature of the supply air entering the space; and
 a flow modulation assembly adapted to adjust the amount of water from the water source relative to the amount of water from the reheat circuit that is entering the condenser through the condenser water circuit supply conduit to maintain the supply air near a selected temperature.

2. The air conditioning system of claim 1 wherein the flow modulation assembly comprises a diverting valve.

3. The air conditioning system of claim 2 wherein the diverting valve is located at the junction of the reheat circuit and the return conduit from the condenser.

4. The air conditioning system of claim 1 wherein the flow modulation assembly comprises a mixing valve.

5. The air conditioning system of claim 4 wherein the mixing valve is located at the junction of the reheat circuit and the supply conduit to the condenser.

6. The air conditioning system of claim 1 wherein the flow modulation assembly comprises a variable speed pump controller operatively connected to the pump of the condenser water reheat circuit.

7. The air conditioning system of claim 6 wherein the flow modulation assembly further comprises a check valve in the reheat circuit to prevent backflow of water from the water source through the condenser water reheat circuit.

8. The air conditioning system of claim 1 wherein the pump in the reheat circuit is located in the condenser water circuit between the condenser and the junction of the reheat circuit with the condenser water circuit.

9. A regenerative condenser water reheat assembly for use with a water-cooled air conditioning system for conditioning air in an enclosed space and that is associated with a water source, the air conditioning system comprising a condenser adapted to conduct heat from a refrigerant to water and having a water inlet and a water outlet, an evaporator to conduct heat from air to refrigerant, a refrigerant circuit including a compressor and an expansion device and adapted to circulate refrigerant between the condenser and evaporator, a condenser water circuit including a supply conduit to circulate water from the water source to the water inlet of the condenser and a return conduit to circulate water from the water outlet of the condenser to the water source, and an air circuit adapted to receive return air from the space, to direct air through the evaporator, and to direct conditioned supply air to the space, the reheat assembly comprising:

a reheat heat exchanger to conduct heat from water to air and adapted to be installed in the air circuit downstream of the evaporator, wherein the reheat heat exchanger has a water inlet and a water outlet;

a regenerative condenser water reheat circuit adapted to circulate water from the return conduit of the condenser water circuit to the water inlet of the reheat heat exchanger and from the water outlet of the reheat heat exchanger to the supply conduit of the condenser water circuit;

a reheat circulating pump to circulate water from the return conduit of the condenser water circuit to the water inlet of the reheat heat exchanger and from the water outlet of the reheat heat exchanger to the supply conduit of the condenser water circuit; and a control assembly comprising:
 a temperature sensor for detecting the temperature of the supply air entering the space; and
 a flow modulation assembly adapted to adjust the amount of water from the water source relative to the amount of water from the reheat circuit that is entering the condenser through the condenser water circuit supply conduit to maintain the supply air near a selected temperature.

10. The reheat assembly system of claim 9 wherein the flow modulation assembly comprises a diverting valve.

11. The reheat assembly of claim 10 wherein the diverting valve is located at the junction of the reheat circuit and the return conduit from the condenser.

12. The reheat assembly of claim 9 wherein the flow modulation assembly comprises a mixing valve.

13. The reheat assembly of claim 12 wherein the mixing valve is located at the junction of the reheat circuit and the supply conduit to the condenser.

14. The reheat assembly of claim 9 wherein the flow modulation assembly comprises a variable speed pump controller operatively connected to the pump of the reheat circuit.

15. The reheat assembly of claim 14 wherein the flow modulation assembly further comprises a check valve in the reheat circuit to prevent backflow of water from the water source through the condenser water reheat circuit.

16. A method for reheating supply air in a water-cooled air conditioning system for conditioning the air in an enclosed space and that is associated with a water source, wherein the air conditioning system comprises a condenser adapted to conduct heat from a refrigerant to water and having a water inlet and a water outlet, an evaporator adapted to conduct heat from air to refrigerant, a refrigerant circuit including a compressor and an expansion device and adapted to circulate refrigerant between the condenser and evaporator, a condenser water circuit including a supply conduit to circulate water from the water source to the water inlet of the condenser and a return conduit to circulate water from the water outlet of the condenser to the water source, and an air circuit adapted to receive return air from the space, to direct it through the evaporator, and to direct supply air into the space, the method comprising:

in response to the temperature of the supply air leaving the air circuit, circulating a modulated amount of condenser water from the return conduit of the condenser water circuit in heat exchange relation with air in the air circuit downstream of the evaporator and then returning the modulated amount of condenser water to the supply conduit of the condenser water circuit, wherein the modulated amount of condenser water is selected to adjust the amount of water from the water source relative to the amount of water that is being returned to the condenser water circuit supply conduit to maintain the supply air near a selected temperature.

* * * * *